United States Patent [19]

Kolt

[11] 4,402,455
[45] Sep. 6, 1983

[54] AUTOMATIC FLUID CONTROL ASSEMBLY

[75] Inventor: Stanley Kolt, Mamaroneck, N.Y.

[73] Assignee: Leonard W. Suroff, Jericho, N.Y.; a part interest

[21] Appl. No.: 297,238

[22] Filed: Aug. 28, 1981

[51] Int. Cl.³ ............................................. G05D 23/12
[52] U.S. Cl. ................................ 236/93 B; 236/93 A; 251/61.2
[58] Field of Search ................. 236/93 B, 93 A, 99 R, 236/99 J, 56, 58; 251/122, 61.2; 239/75

[56] References Cited

U.S. PATENT DOCUMENTS

| | | | |
|---|---|---|---|
| 1,303,140 | 5/1919 | Yeiser | 236/99 J X |
| 1,877,510 | 9/1932 | Hughes | 236/93 A |
| 2,165,171 | 7/1939 | Zinkil | 236/93 B |
| 2,778,573 | 1/1957 | Morgan | 236/56 |
| 3,194,533 | 7/1965 | McLay | 251/122 |
| 3,938,741 | 2/1976 | Allison | 236/93 B X |
| 4,244,518 | 1/1981 | Foller | 236/58 |
| 4,281,790 | 8/1981 | McGinnis | 236/93 B |
| 4,295,602 | 10/1981 | Priesmeyer | 236/93 B |

*Primary Examiner*—William E. Tapolcai
*Attorney, Agent, or Firm*—Leonard W. Suroff

[57] ABSTRACT

An automatic fluid control assembly comprising housing means having an inlet port and outlet port so as to permit the fluid to flow through the housing means between the ports with valve means operatively associated with input port to control the volume of fluid flow through the assembly depending on the position of the valve means relative to the inlet port, and a temperature responsive drive means mounted within the housing means in operative relation to the valve means and adapted to detect temperature changes of the fluid so as to actuate in response to temperature changes within a predetermined range, wherein the valve means is moved to automatically vary the volume of fluid flowing from the outlet port depending upon the temperature of the fluid.

6 Claims, 5 Drawing Figures

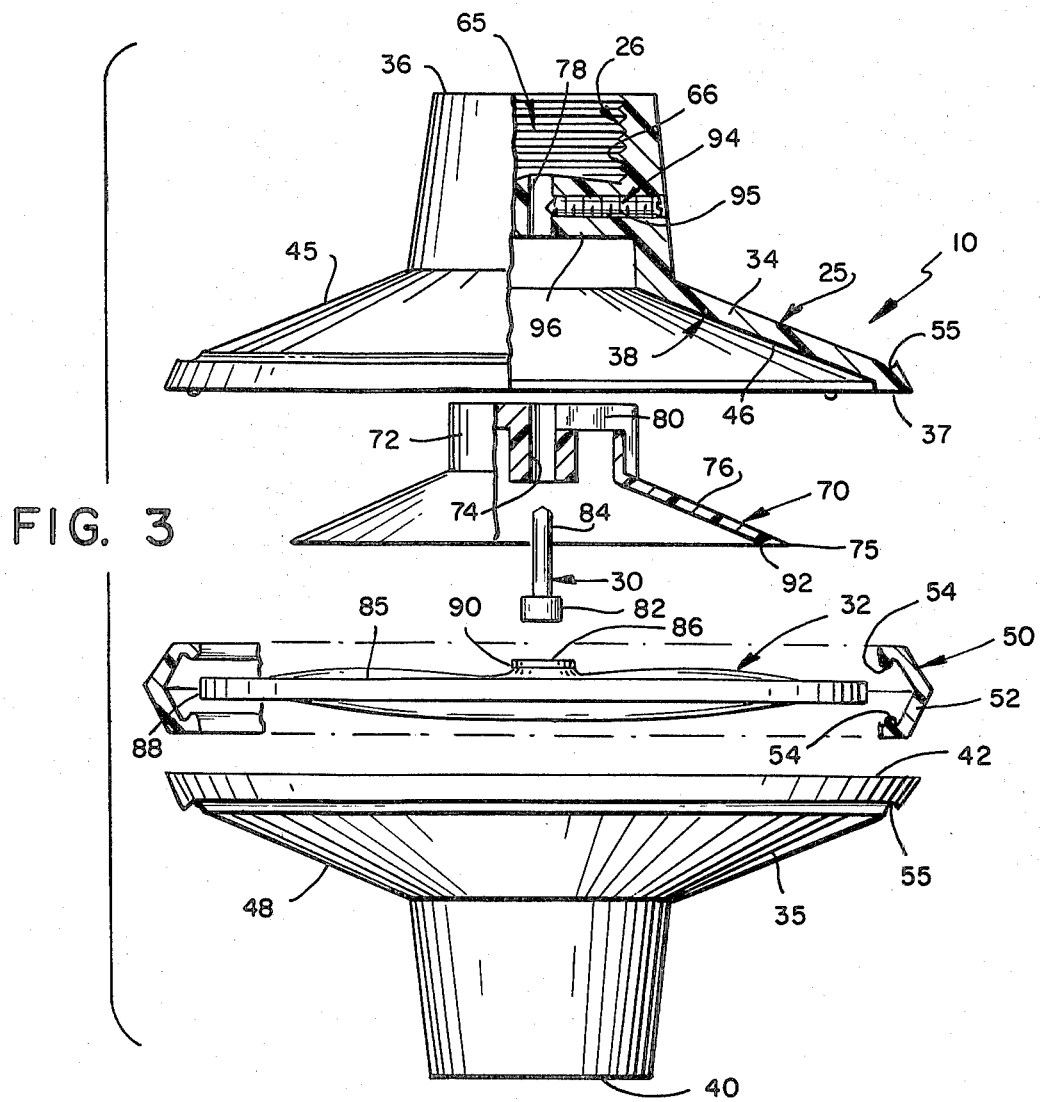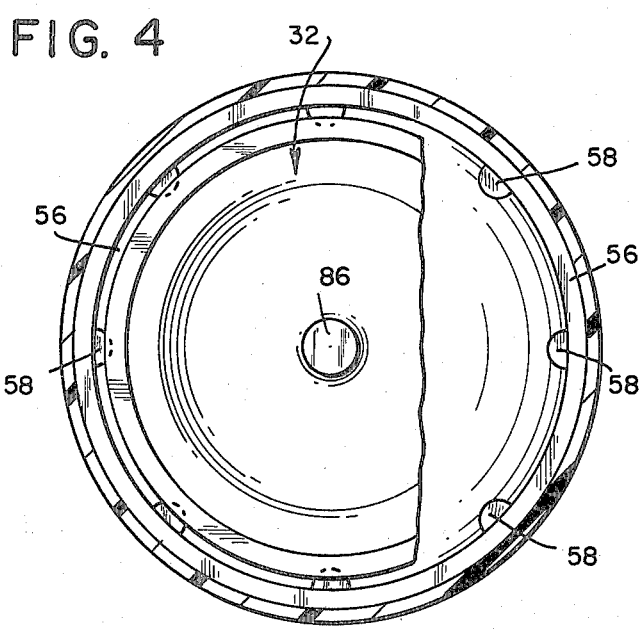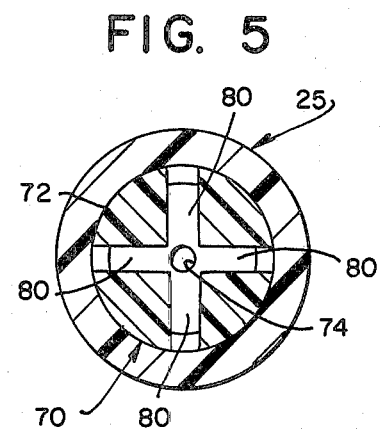

AUTOMATIC FLUID CONTROL ASSEMBLY

BACKGROUND OF THE INVENTION

This invention relates to a valve that automatically closes when fluid in a certain temperature range flows therethrough.

Fluid such as hot water is used daily by millions of people both at home and at motels, hotels, etc. One concern is that if the person does not properly adjust the hot water valve and the valve is open to hot then a person using the shower could be scalded by the hot water. The present invention automatically prevents this from happening.

The present invention also conserves energy because it prevents a person for example in a motel from turning the shower all the way on hot and then expecting the hot water vapor to heat up the bathroom. Since the valve assembly will now automatically close in a certain temperature range the cost of running hot water for prolonged periods of time of a hotel or motel, which the management cannot prevent, is now automatically controlled.

Another feature of the present invention is that if there is a sudden drop in the cold water pressure, resulting in a reduction of cold water volume, the ratio of cold water to hot water changes unbeknownst to the user and the temperature of the water could become extremely hot very quickly. The present invention overcomes this problem in that it shuts off, telling the user that something has occurred. If the cold water thereafter increases in pressure and in turn volume the valve assembly will then gradually open and let the water flow return to its previously selected setting.

OBJECTS OF THE INVENTION

An object of the present invention is to provide an automatic valve assembly for use to limit the temperature of the fluid flowing therethrough.

Another object of the present invention is to provide an automatic valve assembly that opens and closes without the use of any electrical energy.

Other objects and advantages of the present invention will become apparent as the disclosure of the invention proceeds.

SUMMARY OF THE INVENTION

The present invention relates to an automatic fluid control assembly having housing means with an inlet port and outlet port so as to permit the fluid, such as water, to flow through the housing means between the ports. There is provided valve means operatively associated with input port to control the volume of fluid flow through the assembly depending on the position of the valve means relative to the inlet port. The assembly also contains a temperature responsive drive means mounted within the housing means in operative relation to the valve means and adapted to detect temperature changes of the fluid so as to actuate in response to temperature changes within a predetermined range. The valve means is moved automatically to vary the volume of fluid flowing from the outlet port. If the temperature of the fluid is in the range of 100° F. the valve means is open and it closes at about 115° F. preventing substantially all fluid from flowing out of the outlet.

The housing means includes a first member having a top end and a lower end with a cavity extending inwardly from the lower end, and the inlet port extending between the top end and the cavity with a second member having a top end and a lower end with a cavity extending inwardly from the lower end and the outlet port extending between the top end and the cavity. The first member has an outer surface and the cavity thereof includes an inner surface and each one of the surfaces terminate at one end thereof at the lower end.

Coupling means is also provided to retain the members in sealed relation to each other such that the fluid flows from the inlet port through the assembly and out of the outlet port. The coupling means includes a rim extending circumferentially on the members so as to maintain the lower ends thereof in abutting engagement with each other. The coupling means may be fabricated from plastic and even welded to the members which may also be fabricated from plastic. The housing means includes a channel adapted to receive the drive means in fixed position therein. In this way the drive means is seated in position for operation as required. The channel includes a plurality of circumferentially extending spaced apart ribs formed on at least one of the members adjacent to the lower end thereof, so as to maintain a passage between the channel and the drive means wherein fluid can flow therethrough. This provides a continuous path such that if the drive means is activated to substantially close the assembly, then cold water can be turned on to cool off the drive means and in turn open the valve means. The channel may be formed in the cavity of each one of the members.

The assembly further includes mounting means operatively associated with the housing means for permitting coupling thereof to a source of fluid. The mounting means includes a threaded portion extending within the inlet port. There is also provided joining means operatively associated with the housing means for permitting coupling of a fluid regulator. The joining means includes a threaded portion extending within the outlet port.

The assembly also includes guide means mounted in the housing means so as to direct the path of fluid flow between the inlet port to the outlet port. The guide means includes a cap portion having an axially extending bore for receiving the valve means therein, and a body portion having a tapered surface extending outwardly and downwardly from the cap portion. The inlet port includes an axially extending aperture in coaxial alignment with the bore so as to receive the valve means therein. The cap includes a plurality of radially extending grooves so as to permit the flow of fluid from the aperture, over the body portion and through the channel.

The valve means includes a head adapted to extend in abutting engagement with the drive means for reciprocal movement, and a stem extending outwardly from the head and within the bore such that upon the expansion of the drive means the stem moves into the aperture and can stop the flow of fluid into the inlet port and upon the contraction of the drive means the valve means can be retracted to once again permit maximum flow. The stem is dimensioned relative to the aperture such that a minimal flow continues such that if the temperature of the fluid is varied to a colder temperature it would cool the drive means with resultant contraction thereof, and the stem is retracted and permits the flow of fluid through the grooves. The inlet port is in the first member and the outlet port is in the second member.

The drive means includes a fluid containing bellows unit capable of expanding and contracting in response to temperature changes between predetermined limits and to generate a force upon expansion, and the bellows unit having one end free for moving towards and away from the inlet port for engaging the valve means and transmitting a force to obtain the reciprocal movement. The bellows unit has a distal end fixedly mounted within the housing means such as to permit the expansion and contraction in one direction. The free end includes a protrusion for abutting engagement with the valve means.

The assembly also includes volume control means operatively associated with the housing means so as to control the volume of fluid entering the assembly.

BRIEF DESCRIPTION OF THE DRAWINGS

Although the characteristic features of this invention will be particularly pointed out in the claims, the invention itself, and the manner in which it may be made and used, may be better understood by referring to the following description taken in connection with the accompanying drawings forming a part hereof, wherein like reference numerals refer to like parts throughout the several views and in which:

FIG. 3 is an exploded side elevational view of the fluid assembly in accordance with the invention;

FIG. 4 is a top plan view taken along the line 4—4 of FIG. 2; and

FIG. 5 is a sectional view taken along line 5—5 of FIG. 2.

DETAILED DESCRIPTION OF THE DRAWINGS

Figure 1:
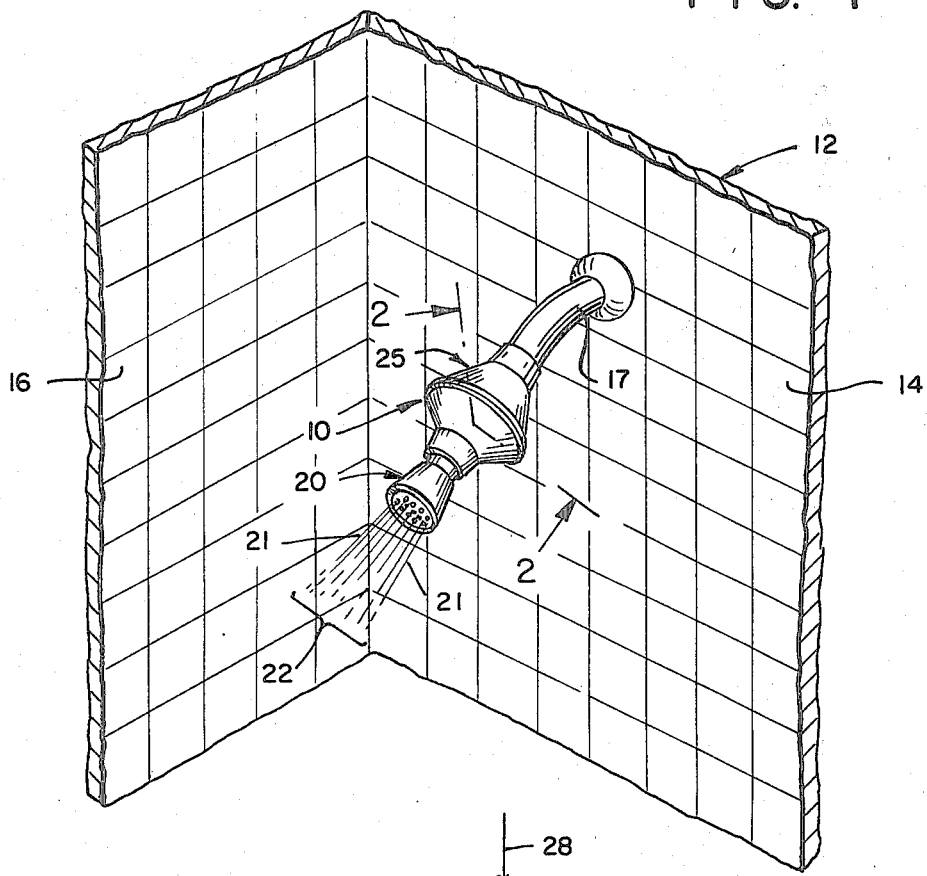
FIG. 1 is a perspective view of the fluid assembly of the present invention mounted on a shower unit.

Referring to the drawings and initially to FIG. 1 thereof there is illustrated an automatic fluid control assembly 10 mounted on a shower unit 12 normally found in a bathroom having walls 14 and 16 with a source of fluid 17 connected to the assembly 10 at one end thereof. A fluid regulator 20 is connected at the opposite end of the assembly 10. The fluid regulator 20 may be of a conventional design to vary the fluid 21 in the spray pattern 22 flowing from the fluid regulator 20.

Although the invention has been illustrated in FIG. 1 with respect to a shower installation, it should be clearly understood that the assembly 10 may be included in any location where there is a desire or need to limit the maximum temperature of the fluid 21 exiting through the assembly 10. For example, on a sink in a kitchen the limit of the temperature may be controlled using the assembly 10. In addition in various industrial or commercial applications the assembly 10 may also be used when automatic temperature control is required. Since the present invention does not require electrical energy to operate it will function at all times.

The automatic fluid control assembly 10 as further illustrated in FIGS. 2-5, includes housing means 25 with an inlet port 26 and outlet port 27 so as to permit the fluid, such as water, to flow through the housing means 25 between the ports 26 and 27 in the direction of arrows 28 and 29. There is provided valve means 30 operatively associated with the inlet port 26 to control the volume of fluid 21 flowing through the assembly 10 depending on the position of the valve means 30 relative to the inlet port 26.

The assembly 10 also contains a temperature responsive drive means 32 mounted within the housing means 25 in operative relation to the valve means 30 and adapted to detect temperature changes of the fluid 21 so as to actuate in response to temperature changes within a predetermined range. The valve means 30 is moved automatically to vary the volume of fluid 21 flowing from the outlet port 27. If the temperature of the fluid is in the range of 100° F. the valve means 30 is substantially open and at 115° F. the valve means 30 is closed preventing almost all fluid 21 from flowing out of the outlet port 27 and in turn the fluid regulator 21. When the water reaches 100° F. the valve means 30 then opens again automatically.

The housing means 25 includes a first member 34 and second member 35. The first member has a top end 36 and a lower end 37 with a cavity 38 extending inwardly from the lower end 37. The inlet port 26 extends between the top end 36 and the cavity 38. The second member 35 has a top end 40 and a lower end 42 with a cavity 44 extending inwardly from the lower end 42 and the outlet port 27 extends between the top end 40 and the cavity 44. The first member 34 has an outer surface 45 and the cavity 38 thereof includes an inner surface 46, with each one of the surfaces 45 and 46 terminating at the lower end 37. The second member 35 also has an outer surface 48 and the cavity 44 thereof includes an inner surface 50, with each one of the surfaces 48 and 50 terminating at the lower end 42. The size and shape of the members 34 and 35 may vary depending on the desired application, cosmetics, etc. The fluid regulator can operate above or below 100° F. to 115° F. depending on the application.

Coupling means 50 is also provided to retain the members 34 and 35 in sealed relation to each other such that the fluid 21 flows from the inlet port 26 through the assembly 10 and out of the outlet port 27. The coupling means 50 includes a rim 52 extending circumferentially on the members 34 and 35 which may have a circular configuration as illustrated. The rim 52 maintains the lower ends 37 and 42 in abutting or sealed engagement with each other. The coupling means 50 may be fabricated from plastic and even welded to the members 34 and 35 which may also be fabricated from plastic. The rim 52 may include a projection 54 adapted to extend within a recess 55 contained on the outer surfaces 45 and 48 (See FIG. 3). The rim 52 may be moulded in place after the housing means 25 has been previously assembled. In the alternative the members 34 and 35 may be sealed or welded by ultrasonic vibratory energy to obtain a liquid tight seal at the interface of surfaces 37 and 42.

Figure 2:
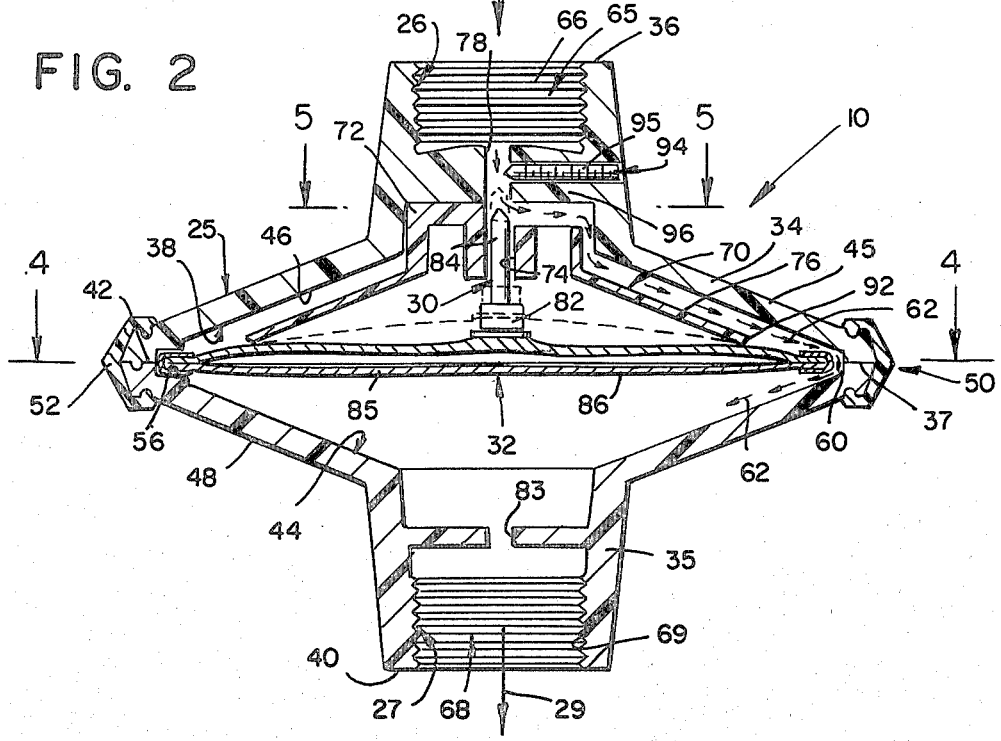
FIG. 2 is a sectional view taken along line 2—2 of FIG. 1.

The housing means 25 may also include a channel 56 adapted to receive the drive means 32 in fixed position therein. In this way the drive means 32 is seated in position for operation as required (See FIG. 4). The channel 56 includes a plurality of circumferentially extending spaced apart ribs 58 formed on at least one of the members 34 or 35 adjacent to the lower end 37 or 42 thereof, so as to maintain a passage 60 as illustrated in FIG. 2, between the channel 56 and the drive means 32 wherein fluid 21 can flow therethrough in the direction of arrows 62. This provides a continuous path such that if the drive means 32 is activated to substantially close the assembly 10, then cold water can be turned on to cool off the drive means 32 and in turn open the valve means 30. The channel 56 may be formed in the cavity 30 and 44 of each one of the members 34 and 35 respectively.

The assembly 10 further includes mounting means 65 operatively associated with the housing means 25 for permitting coupling thereof to the source of fluid 17. The mounting means 65 may include a threaded portion 66 extending within the inlet port 26. There is also provided joining means 68 operatively associated with the housing means 25 for permitting coupling of the fluid regulator 20. The joining means 68 may include a threaded portion 69 extending within the outlet port 27. The threaded portions 66 and 69 may also be outside of the members 34 and 35.

The assembly 10 also includes guide means 70 mounted in the housing means 25 so as to direct the path of fluid 21 to flow between the inlet port 26 to the outlet port 27. The guide means 70 includes a cap portion 72 having an axially extending bore 74 for receiving the valve means 30 therein. A body portion 75 may be integrally formed with the cap portion 72 and has a tapered surface 76 extending outwardly and downwardly from the cap portion 72. The inlet port 26 includes an axially extending aperture 78 in co-axial alignment with the bore 74 so as to receive the valve means 30 therein. The cap portion 72 includes a plurality of radially extending grooves 80 so as to permit the flow of fluid 21 from the aperture 78, through the grooves 80, over the body portion 75 on the tapered surface 76 and through the channel 60 to the outlet port 27.

The valve means 30 includes a head 82 adapted to extend in abutting engagement with the drive means 32 for reciprocal movement therewith. A stem 84 extends outwardly from the head 82 and within the bore 74 such that upon the expansion of the drive means 32 the stem 84 moves into the aperture 78 and can stop the flow of fluid 21 into the inlet port 26. Upon the contraction of the drive means 32 the valve means 30 can be retracted to once again permit maximum flow. The stem 84 is dimensioned relative to the aperture 78 such that a minimal flow continues, such that if the temperature of the fluid 21 is varied to a colder temperature it would cool the drive means 32 with resultant contraction thereof, and the stem 84 is retracted and permits the flow of fluid 21 through the grooves 80. The inlet port 26 is in the first member 25 and the outlet port 27 is in the second member 35, with an orifice 83 provided in the second member 35.

The drive means 32 includes a fluid containing bellows unit 85 capable of expanding and contracting in response to temperature changes between predetermined limits and to generate a force upon expansion, and the bellows unit 85 having one free end 86 for moving towards and away from the inlet port 26 for engaging the valve means 30 and transmitting a force to obtain the reciprocal movement. The bellows unit 85 has a distal end 88 fixedly mounted within the housing means 25 such as to permit the expansion and contraction in one direction. The free end 86 includes a protrusion 90 for abutting engagement with the head 82 of the valve means 30.

As illustrated in FIG. 2 the guide means 70 has a lip 92 that is at one end of the body portion 75 that terminates prior to the distal end 88 such that the fluid 21 will pass over a portion of the bellows unit 85. In this manner the temperature of the fluid 21 is conducted to the bellows unit 85. If the temperature or the fluid 21 is for a shower and say below 100° F. the bellows unit 85 does not expand and the valve means 30 remains in the position illustrated in FIG. 2. This permits a continuous flow of fluid 21 through the aperture 78, grooves 80, and passage 60.

When the temperature or the fluid 21 reaches the temperature in the range of about 115° F., for a shower application, the expansion of the bellows unit 85 automatically is completed and the free end 86 expands to the level indicated in phantom (broken line) in FIG. 2, causing the valve means 30 to move up which results in the stem 84 entering into the aperture 78, as illustrated in phantom in FIG. 2. When this occurs the flow of fluid into the aperture 78 is substantially prevented and in turn the flow of fluid 21 from the fluid regulator 20 essentially stops.

With the person still in the shower the assembly 10 has been designed to permit the cooling of part of the bellows unit 85 to be accelerated by using cool water for example. The dimensional relationship between the diameter of the stem 84 and the aperture 78 is such that a minimum flow can continue. In this manner a person using a shower can then shut the hot water or turn up the cold water such that in a minimal amount of time the bellows unit 85 starts to contract. The water pressure then forces the valve means 30 to also move back and once again open the grooves 80 to the fluid 21 for flowing therethrough. Accordingly the valve means 30 need not be mechanically coupled to the bellows unit 85.

The thermal power source for the drive means 32 in the assembly 10 is temperature responsive and mounted to detect temperature changes in the housing means 25 and adapted to actuate to temperature changes within a predetermined range. The sealed bellows power unit 85 is of conventional design. The bellows power unit 85 is of a design that if not under fluid pressure, or unloaded it would be closed at 65° F. and expanded or open at 75° F. The fluid pressure applied to it results in the fact that at 100° F. the bellows power unit 85 is open and at 115° F. it is fully expanded. The bellows unit 85 is filled with a heat expansible fluid, the volatility of which is matched along with the shell thickness, type of metal and volume of the unit, to provide a suitable expansion at the desired temperature range. In addition to being actuated suitable at the appropriate design temperatures, the drive means 32 of the present invention should also be capable of generating a force in the range of about 50–110 pounds per square inch in order to be operable against the fluid force. It will be understood that any of a number of temperature-sensitive power drive units may be utilized in assembly 10 so long as their expansion and contraction characteristics are predictable and the force generated is suitable over the desired temperature range.

Accordingly, the fluid containing bellows unit 85 is capable of expanding and contracting in response to temperature changes between predetermined limits and to generate a force upon expansion.

The assembly 10 also includes volume control means 94 operatively associated with the housing means 25 so as to control the volume of fluid 21 entering the assembly 10. The volume control means 94 may include an element 95 in the form of a screw mounted in the elbow 96 which can vary the total cross-sectional area of the aperture 78 in the elbow 96. The adjustment of the screw 95 is used at the time of installation to compensate for different pressures at the installation site. Water pressure can vary between 30 pounds to 110 pounds per square inch. The adjustment of element 95 is such as to change the size of the opening in aperture 78 to vary both volume and pressure. This adjustment is even necessary in a tall building where normal water pressure may vary from floor to floor.

Although an illustrative embodiment of the invention has been described in detail herein with reference to the accompanying drawings, it is to be understood that the invention is not limited to the precise embodiment, and that various changes and modifications may be effected therein without departing from the scope or spirit of the invention.

I claim:

1. An automatic fluid control assembly comprising:
    A. housing means having an inlet port and outlet port so as to permit the fluid to flow through said housing means between said ports, said housing means including;
        a. a first member having a top end and a lower end with a cavity extending inwardly from said lower end, and said inlet port extending between said top end and said cavity, and
        b. a second member having a top end and a lower end with a cavity extending inwardly from said lower end and said outlet port extending between the top end and said cavity,
        c. a channel having a plurality of circumferentially extending spaced apart ribs formed on at least one of said members adjacent to said lower end thereof;
    B. valve means operatively associated with said inlet port to control the volume of fluid flow through the assembly depending on the position of said valve means relative to said inlet port; and
    C. temperature responsive drive means mounted within said housing means within said channel so as to maintain the passage between said channel and said drive means wherein fluid can flow therethrough, said temperature responsive drive means being in operative relation with said valve means and adapted to detect temperature changes of the fluid so as to actuate in response to temperature changes within a predetermined range, said valve means being moved to automatically vary the fluid flowing from said inlet port dependent upon the temperature of said fluid.

2. The assembly as defined in claim 1, wherein said channel is formed in said cavity of each one of said members.

3. An automatic fluid control assembly comprising:
    A. housing means having an inlet port, said inlet port including an axially extending aperture in coaxial alignment with said bore so as to receive a valve means therein, and an outlet port so as to permit the fluid to flow through said housing means between said ports, said housing means including guide means so as to direct the path of fluid flow between said inlet port to said outlet port, said guide means including;
        a. a cap portion having an axially extending bore for receiving a valve means therein, said cap including a plurality of radially extending grooves so as to permit the flow of fluid from said aperture and over said body portion, and
        b. a body portion having a tapered surface extending outwardly and downwardly from said cap portion,
    B. said valve means operatively associated with said inlet port to control the volume of fluid flow through the assembly depending on the position of the valve means relative to said inlet port; and
    C. temperature responsive drive means mounted within said housing means in operative relation to said valve means and adapted to detect temperature changes within a predetermined range, said valve means moving to vary the volume of fluid flowing from said inlet port responsive to the temperature of said fluid.

4. The assembly as defined in claim 3, wherein said valve means includes:
    a. a head adapted to extend in abutting engagement with said drive means for reciprocal movement, and
    b. a stem extending outwardly from said head and within said bore such that upon the expansion of said drive means said stem moves into said aperture and can essentially stop the flow of fluid into said inlet port and upon the contraction of said drive means the valve means is retracted by the pressure of said fluid.

5. The assembly as defined in claim 4, wherein said stem is dimensioned relative to said aperture such that a minimal flow continues such that if the temperature of the fluid is varied to a colder temperature it would cool the drive means with resultant contraction thereof, wherein said stem is retracted and permits the flow of fluid through said grooves.

6. The assembly as defined in claim 5, wherein said inlet port is in said first member and said outlet port is in said second member.

* * * * *